3,597,402
POLYMERIZATION OF CYCLIC ALKYLENE EPISULFIDES WITH CATALYST SYSTEMS OF A POLYMERIC ALUMINUM ALCOHOLATE AND AN ORGANOMETALLIC
Hideo Tomomatsu, Austin, Tex., assignor to Jefferson Chemical Company, Inc., Houston, Tex.
No Drawing. Filed Apr. 4, 1969, Ser. No. 813,721
Int. Cl. C08g 23/06, 25/00
U.S. Cl. 260—79
16 Claims

ABSTRACT OF THE DISCLOSURE

High molecular weight polymers are obtained from the polymerization of cyclic ethylene and propylene episulfides and the co-polymerization of cyclic ethylene and propylene oxides with cyclic ethylene and propylene episulfides employing a binary catalyst system of an organometallic compound of dialkyl zinc or trialkyl aluminum and a polymeric aluminum alcoholate having the formula:

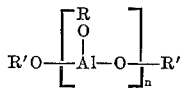

Cyclic alkylene episulfides employed are those containing sulfur-carbon rings consisting of one sulfur atom in a ring with two or three carbon atoms. The polyepisulfides and co-polymers of episulfides are useful in the elastomer field.

CROSS-REFERENCE TO RELATED APPLICATION

My co-pending U.S. application Ser. No. 626,391 filed Mar. 28, 1967, now Pat. No. 3,459,685 describes the use of the catalyst systems of the present invention to polymerize cyclic alkylene oxides.

BACKGROUND OF THE INVENTION

Field of the invention

This invention is concerned with the polymerization of cyclic alkylene episulfides and the co-polymerization of cyclic alkylene oxides with episulfides using a binary catalyst system of an organometallic compound and a polymeric aluminum alcoholate.

Description of the prior art

The polymerization of alkylene oxides and alkylene episulfides is well known. British Pats. 1,042,253 and 1,059,491 and French Pat. 1,444,664 describe various processes for the preparation of polyepisulfides and co-polymers thereof.

SUMMARY OF THE INVENTION

I have now developed a method for the polymerization of cyclic alkylene episulfides and the co-polymerization of cyclic ethylene and propylene oxides with cyclic episulfides whereby strong, nonsticky, high molecular weight polymers may be obtained. In accordance with my invention, a binary catalyst system of a polymeric aluminum alcoholate and an organometallic compound as defined below is employed.

DESCRIPTION OF THE PREFERRED EMBODIMENT

Polymeric aluminum alcoholates for use in my invention may be represented by the formula:

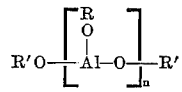

wherein R is an aliphatic, cycloaliphatic or aromatic hydrocarbon radical containing from 1 to 18 carbon atoms, R' is hydrogen or R, and $n$ is at least 2. For example, R may be ethyl, isopropyl, butyl, cyclohexyl, nonyl, octadecyl, benzyl, phenyl and naphthyl. The degree of polymerization of such products is at least 2. Methods for the preparation of polymeric aluminum alcoholate are known, and the particular way in which the polymer is prepared is immaterial insofar as my invention is concerned. Their preparation is described, for example, by Andrianov, Metallorganic Polymers, Interscience Publishers, New York (1965), p. 327. A preferred polymeric aluminum alcoholate is that prepared from aluminum isopropoxide.

The organometallic compound to be used in conjunction with the polymeric aluminum alcoholate is defined as one having the formula $MZX_{y-1}$ wherein M is a metal belonging to Groups II and III, and preferably Groups II-B and III-A, of the Periodic Table, Z is an alkyl or aryl group containing from 1 to 18 carbon atoms, X is hydrogen, halogen, Z or an alkoxy or aryloxy group containing 1 to 18 carbon atoms, and $y$ is a whole number equal to the valence of M. This metallic compound will contain at least one alkyl or aryl group and may contain additional groups of alkoxy, aryloxy, hydrogen or a halogen such as chlorine, bromine, or iodine. Examples of M include magnesium, calcium, strontium, barium, zinc, cadmium and aluminum. Typical examples of Z include methyl, ethyl, phenyl, butyl, hexyl, cyclobutyl, cyclohexyl, tolyl, ethoxy, propoxy, butoxy, and phenoxy, Z is preferably an alkyl group. Preferred organometallic compounds are diethyl zinc and triethyl aluminum. Other acceptable compounds include diethyl aluminum hydride, ethyl aluminum dichloride, diphenyl zinc, methyl zinc phenoxide, dilauryl cadmium, triethyl gallium, phenyl cyclohexyl beryllium and dibenzyl cadmium.

The cyclic alkylene episulfides that may be polymerized by my process are those containing sulfur-carbon rings in which one sulfur atom is combined with two or more carbon atoms in the ring. The ring carbon atoms of the episulfides may be substituted with alkyl, aryl, cycloalkyl, alkoxyl and haloalkyl groups. The most common cyclic alkylene episulfides are those containing the three membered ring. Examples of such episulfides include ethylene episulfide, 1,2-propylene episulfide, 1,2-butylene episulfide, 2,3-butylene episulfide, 1,2-dodecene episulfide and styrene episulfide.

The cyclic alkylene oxides that may be co-polymerized with episulfides by my process are those containing oxygen-carbon rings in which one oxygen atom is combined with two or three carbon atoms in the ring and are disclosed in my copending U.S. patent application Ser. No. 626,391, now Pat. No. 3,459,685 supra.

The concentration of the mixed catalyst may be varied from 1 to 20 wt. percent or higher based on the weight of the monomeric episulfide or the weight of the monomers for the co-polymers of the invention. It is preferred to use from about 5 to 10 wt. percent catalyst. The weight ratio of polymeric aluminum alcoholate to metallic compound in the catalyst may be varied from about 10:1 to 1:10 with the preferred ratio being from about 1:2 to 2:1 with a ratio of about 1:1 being particularly preferred.

The polymerization may be run at a temperature within the range of 0° to 200° C.; however, it is preferred to employ temperatures within the range of about 25° to about 150° C. To avoid loss of volatile components, the reaction is normally conducted in a closed vessel. The particular pressure at which the reaction is conducted is not critical, and ambient pressures are generally employed.

The polymerization reaction should be conducted in a dry, inert atmosphere. A dry, inert solvent is employed. The solvent may be an aliphatic or aromatic hydrocarbon or an ether. Typical solvents include cyclohexane, n-hexane, petroleum ether, pentane, heptane, benzene, toluene, diethyl ether and dipropyl ether.

After the polymerization is complete, the catalyst may be quenched by the addition of a suitable amount of a lower aliphatic alcohol, preferably isopropyl alcohol, in solution in an inert solvent as described above. Generally, sufficient alcohol is used to react with both components of the catalyst system. The presence of the quenched catalyst in the polymer does not adversely affect the polymer properties. It is also possible to add a small amount of antioxidant (usually 0.3 to 3.0 wt. percent based on the total monomer used) in solution in a solvent to increase the stability of the polymer.

The polyepisulfides and co-polymers of episulfides of my invention are useful in the elastomer field.

My invention will be further illustrated by the following examples:

EXAMPLE I

Polymeric aluminum isopropoxide (2.14 grams) and 200 ml. of dried benzene were placed in a Pyrex glass pressure bottle under dry nitrogen and the mixture was stirred. Ten grams of a 25% diethyl zinc heptane solution was added to the mixture and the stirring was continued for about ten minutes. Fifty grams of propylene episulfide was added to the catalyst mixture. The pressure bottle was closed by a stainless steel cap equipped with a Teflon O-ring under the same inert atmosphere. The mixture was subjected to shaking at 80° C. for 24 hours. After evaporating the solvent in open air. 54 grams of nonsticky, white, rubbery poly(propylene episulfide) was recovered.

EXAMPLE II

The same reaction described in Example I was carried out at 40° C. for 24 hours. The reaction product was 48 grams of nonsticky, transparent, strong rubbery poly(propylene episulfide).

EXAMPLE III

Polymeric aluminum isopropoxide (2.14 grams) and 200 ml. of dried benzene were placed in a Pyrex glass pressure bottle under dry nitrogen and the mixture was stirred. Ten grams of a 25% diethyl zinc heptane solution was added to the mixture and the stirring was continued for ten minutes. A mixture of 25 grams of propylene oxide and 25 grams of propylene episulfide was added to the catalyst mixture. The pressure bottle was closed by a stainless steel cap equipped with a Teflon O-ring and the mixture was subjected to shaking at 80° C. for 24 hours. After evaporation of the solvent in open air, 48 grams of pale yellow colored, slightly sticky rubbery material was recovered.

EXAMPLE IV

Polymeric aluminum isopropoxide (2.14 grams), 200 ml. of dried benzene, and 10 grams of 25% diethyl zinc in heptane were placed in a Pyrex glass pressure bottle under dry nitrogen and the mixture was stirred. Forty grams of propylene oxide was added to the catalyst mixture and the pressure bottle was closed by a stainless steel cap equipped with a Teflon O-ring. The mixture was partially polymerized alone at room temperature for one hour. Ten grams of propylene episulfide was then added to the reaction mixture and the resulting mixture was subjected to shaking at 40° C. for 12 hours. After evaporation of the solvent, 46 grams of tough, nonsticky, white, rubbery co-polymer was recovered.

Comparable results are obtained using other catalysts of my invention.

What is claimed is:

1. A method for the polymerization of a cyclic alkylene episulfide having a sulfur-carbon ring in which the sulfur atom is joined with 2 to 3 carbon atoms in the ring, which comprises mixing the episulfide in a closed vessel and in a dry, inert atmosphere at 0° to 200° C. with from 1 to 20 wt. percent based on the weight of episulfide of a binary catalyst system of (a) a polymeric aluminum alcoholate represented by the formula:

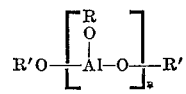

wherein R is an aliphatic, cycloaliphatic or aromatic hydrocarbon radical containing 1 to 18 carbon atoms, R' is hydrogen or R, and $n$ is at least 2 with (b) an organometallic compound having the formula

$$MZX_{y-1}$$

wherein M is a metal from Groups II and III of the Periodic Table, Z is an aryl or alkyl group containing from 1 to 18 carbon atoms, X is hydrogen, halogen, Z or an alkoxy or aryloxy group containing 1 to 18 carbon atoms, and $y$ is an integer equal to the valence of M, the weight ratio of compound (A) to compound (B) in the catalyst mixture being within the range of from 10:1 to 1:10.

2. A method as in claim 1 wherein M is a metal from Groups II–B and III–A of the Periodic Table.

3. A method as in claim 2 where the temperature is within the range of 25° to 150° C. and the catalyst concentration is within the range of 5 to 10 wt. percent based on the weight of episulfide and the weight ratio of compound (A) to compound (B) is within the range of 2:1 to 1:2.

4. A method as in claim 2 wherein Z is an alkyl group containing 1 to 18 carbon atoms.

5. A method as in claim 4 wherein compound (A) is polymeric aluminum isopropoxide, compound (B) is diethyl zinc and the alkylene episulfide is ethylene episulfide or propylene episulfide.

6. A method as in claim 5 wherein the temperature is within the range of 25° to 150° C., the concentration of the catalyst mixture is between 5 to 10 wt. percent based on the weight of episulfide, the weight ratio of polymeric aluminum isopropoxide to diethyl zinc is between 2:1 and 1:2 and the episulfide is propylene episulfide.

7. A method as in claim 4 wherein compound (A) is polymeric aluminum isopropoxide, compound (B) is triethyl aluminum and the alkylene episulfide is ethylene episulfide or propylene episulfide.

8. A method as in claim 7 wherein the temperature is within the range of 25° to 150° C., the catalyst concentration is between 5 to 10 wt. percent based on the weight of episulfide, the weight ratio of polymeric aluminum isopropoxide to triethyl aluminum is between 2:1 and 1:2, and the episulfide is propylene episulfide.

9. A method for the co-polymerization of a cyclic alkylene oxide having an oxygen-carbon ring in which the oxygen atom is joined with 2 to 3 carbon atoms in the ring and a cyclic alkylene episulfide having a sulfur-carbon ring in which the sulfur atom is joined with 2 to 3 carbon atoms in the ring, which comprises mixing the oxide and episulfide in a closed vessel and in a dry inert atmosphere at 0° to 200° C. with from 1 to 20 wt. percent based on the weight of oxide and episulfide of a binary catalyst system of (A) a polymeric alcoholate represented by the formula:

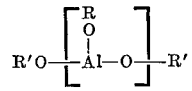

wherein R is an aliphatic, cycloaliphatic or aromatic hydrocarbon radical containing 1 to 18 carbon atoms, R' is hydrogen or R, and $n$ is at least 2 with (B) an organometallic compound having the formula

$$MZX_{y-1}$$

wherein M is a metal from Groups II and III of the Periodic Table, Z is an aryl and alkyl group containing from 1 to 18 carbon atoms, X is hydrogen, halogen, Z or an alkoxy or aryloxy group containing 1 to 18 carbon atoms, and $y$ is an integer equal to the valence of M, the weight ratio of compound (A) to compound (B) in the catalyst mixture being within the range of from 10:1 to 1:10.

10. A method as in claim 9 wherein M is a metal from Groups II-B and III-A of the Periodic Table.

11. A method as in claim 10 wherein the temperature is within the range of 25° to 150° C. and the catalyst concentration is within the range of 5 to 10 wt. percent based on the total weight of episulfide and oxide to be copolymerized and the weight ratio of compound (A) to compound (B) is within the range of 2:1 to 1:2.

12. A method as in claim 11 wherein Z is an alkyl group containing 1 to 18 carbon atoms.

13. A method as in claim 12 wherein compound (A) is polymeric aluminum isopropoxide, compound (B) is diethyl zinc and the alkylene oxide is propylene oxide and the alkylene episulfide is propylene episulfide.

14. A method as in claim 13 wherein the temperature is within the range of 25° to 150° C., the concentration of the catalyst mixture is between 5 to 10 wt. percent based on the total weight of oxide and episulfide, the weight ratio of polymeric aluminum isopropoxide to diethyl zinc is between 2:1 and 1:2 and the oxide is added to the catalyst mixture and partially polymerized before the episulfide is added.

15. A method as in claim 12 wherein compound (A) is polymeric aluminum propoxide, compound (B) is triethyl aluminum and the alkylene oxide is propylene oxide and the alkylene episulfide is propylene episulfide.

16. A method as in claim 15 wherein the temperature is within the range of 25° to 150° C., the catalyst concentration is between 5 to 10 wt. percent based on the weight of oxide and episulfide, the weight ratio of polymeric aluminum isopropoxide to triethyl aluminum is between 2:1 and 1:2 and the oxide is added to the catalyst mixture and partially polymerized before the episulfide is added.

References Cited

UNITED STATES PATENTS

| | | | |
|---|---|---|---|
| 3,324,051 | 6/1967 | Lal | 260—2 |
| 3,325,456 | 6/1967 | Adamek | 260—79.7 |
| 3,459,685 | 8/1969 | Tomomatsu | 260—2 |

DONALD E. CZAJA, Primary Examiner

M. I. MARQUIS, Assistant Examiner

U.S. Cl. X.R.

260—2A, 2EP, 79.7R